(12) United States Patent
Takahashi et al.

(10) Patent No.: US 8,191,014 B2
(45) Date of Patent: May 29, 2012

(54) INFORMATION PROCESSING APPARATUS, DISPLAY CONTROL METHOD AND PROGRAM

(75) Inventors: Hirotaka Takahashi, Tokyo (JP); Kenji Ozawa, Chiba (JP); Maki Yamamoto, Tokyo (JP); Pieter Coenen, Lier (BE)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 12/616,390

(22) Filed: Nov. 11, 2009

(65) Prior Publication Data

US 2010/0131901 A1 May 27, 2010

(30) Foreign Application Priority Data

Nov. 27, 2008 (JP) ................................ 2008-302259

(51) Int. Cl.
*G06F 13/00* (2006.01)
*G06F 15/00* (2006.01)
(52) U.S. Cl. ....................................... 715/838; 715/723
(58) Field of Classification Search .......... 715/761–765, 715/851–853, 738, 723, 719, 840, 739–741, 715/838
See application file for complete search history.

(56) References Cited

U.S. PATENT DOCUMENTS

| 2008/0282195 A1* | 11/2008 | Nakagawa et al. | 715/838 |
| 2009/0007018 A1* | 1/2009 | Ikeda et al. | 715/838 |
| 2010/0037179 A1* | 2/2010 | Ito | 715/838 |

FOREIGN PATENT DOCUMENTS

| JP | 3-87914 | 4/1991 |
| JP | 9-97155 | 4/1997 |
| JP | 2004-152171 | 5/2004 |
| JP | 2005-285076 | 10/2005 |
| JP | 2008-209641 | 9/2008 |

OTHER PUBLICATIONS

Japanese Office Action issued Nov. 9, 2010, in Patent Application No. 2008-302259.
Sony Product "VAIO NAVI", http://www.vaio.sony.co.jp/Products/Solution/VAIOnavi/, 3 pages (with partial English Translation).

* cited by examiner

*Primary Examiner* — Kevin Nguyen
(74) *Attorney, Agent, or Firm* — Oblon, Spivak, McClelland, Maier & Neustadt, L.L.P.

(57) ABSTRACT

There is provided an information processing apparatus including a display control unit that displays a list screen of thumbnails associated with content, an execution unit that executes any application using the content associated with the thumbnails, and an image generation unit that generates an execution state image showing an execution state of the application by the execution unit, wherein the display control unit displays the execution state image generated by the image generation unit in at least a portion of an area where the list screen is displayed.

16 Claims, 8 Drawing Sheets

INFORMATION PROCESSING APPARATUS, DISPLAY CONTROL METHOD AND PROGRAM

BACKGROUND OF THE INVENTION

1. Field of the Invention

The present invention relates an information processing apparatus, a display control method, and a program, and in particular, relates to an information processing apparatus capable of displaying a list of thumbnails of a plurality of pieces of content, a display control method, and a program.

2. Description of the Related Art

In recent years, an increasing amount of content extending over various categories such as the photo, video, and music is managed by a general user as a result of a marked increase in storage capacity of an information processing apparatus such as a PC (Personal Computer) used by the general user. The user activates an application suitable for each piece of content to display or process photos or reproduce video or music.

For example, the application described in "Sony Product Information |VAIO|Software |VAIO Navigation", [online], [search on Oct. 14, 2008], Internet <URL: http://www.vaio-.sony.co.jp/Products/Solution/VAIOnavi/> classifies software in accordance with the category of content and provides a screen interface that can facilitate the selection of software to reproduce or edit content. On the screen interface, one of the categories of content such as the photo, video, and music is first selected by the user. Then, software corresponding to the selected category and a description of the software are displayed on the screen interface. The user reads and examines the description of the displayed software to select software fitting the user's purpose. Then, an information processing apparatus activates the software selected by the user.

SUMMARY OF THE INVENTION

However, if there are many pieces of software installed on a PC, it is difficult for the user to search for intended software without reading the display of description of individual software one by one. Thus, it is difficult for the user to easily understand the function that can be realized by each application.

The present invention has been made in view of the above issue and it is desirable to provide a novel and improved information processing apparatus that enables the user to easily understand the function realizable by an application, a display control method, and a program.

According to an embodiment of the present invention, there is provided an information processing apparatus including a display control unit that displays a list screen of thumbnails associated with content, an execution unit that executes any application using the content associated with the thumbnails, and an image generation unit that generates an execution state image showing an execution state of the application by the execution unit. The display control unit displays the execution state image generated by the image generation unit in at least a portion of an area where the list screen is displayed.

The execution state image generated by the image generation unit is an image that reproduces a function of the application in a pseudo manner.

According to the above configuration, the display control unit displays the list screen of thumbnails associated with content, and the execution unit executes any application using content associated with the thumbnails. The image generation unit generates an execution state image showing an execution state of the application, and the display control unit displays the generated execution state image in at least a portion of the area where the list screen is displayed.

Accordingly, the function realizable by any application can be reproduced in a pseudo manner by using content associated with listed thumbnails. That is, the user can be caused to recognize details of any application or how to use the application by reproducing an execution state of the application. Here, the display to cause the user to recognize details of the application or how to use the application is also called a promotion display below. Due to the promotion display concerning any application, the user can easily understand the function realizable by the application or details of a service without reading a manual or instruction manual for each application.

The application executed by the execution unit may use content associated with the thumbnails in the area where the execution state image is displayed.

The application executed by the execution unit may use content associated with the thumbnails around the area where the execution state image is displayed.

The application executed by the execution unit may have a function based on a category of content associated with the thumbnails.

The application executed by the execution unit may be an application having a function in accordance with details of content associated with the thumbnails.

The application executed by the execution unit may use photo content associated with, among the thumbnails displayed in the list screen, the thumbnails containing a face area.

The application executed by the execution unit may use content associated with, among the thumbnails displayed in the list screen, a predetermined number of the thumbnails.

According to another embodiment of the present invention, there is provided an information processing apparatus including a display control unit that lists a plurality of images associated with content in a predetermined display area, an execution unit that executes any application using the content associated with the images, and a reproducing unit that reproduces an execution state of the application by the execution unit. The reproducing unit reproduces the execution state of the application using at least a portion of the predetermined display area.

The reproducing unit may reproduce dynamic image reproduction processing using image content or video content associated with the images.

The reproducing unit may reproduce music reproduction processing using music content associated with the images.

The reproducing unit may reproduce the execution state of the application using content associated with the images that were displayed in the display area to reproduce the execution state of the application.

The reproducing unit may reproduce the execution state of the application using at least a portion of the predetermined display area by causing the execution unit to execute the application.

According to another embodiment of the present invention, there is provided a display control method including the steps of displaying a list screen of thumbnails associated with content, executing any application using the content associated with the thumbnails, generating an execution state image showing an execution state of the application, and displaying the generated execution state image in at least a portion of an area where the list screen is displayed.

According to another embodiment of the present invention, there is provided a program causing a computer to function as an information processing apparatus including a display control unit that displays a list screen of thumbnails associated with content, an execution unit that executes any application using the content associated with the thumbnails, and an image generation unit that generates an execution state image showing an execution state of the application by the execution unit. the display control unit displays the execution state image generated by the image generation unit in at least a portion of an area where the list screen is displayed.

According to the present invention, as described above, the user can easily understand the function realizable by any application.

DETAILED DESCRIPTION OF EMBODIMENT

Figure 1:
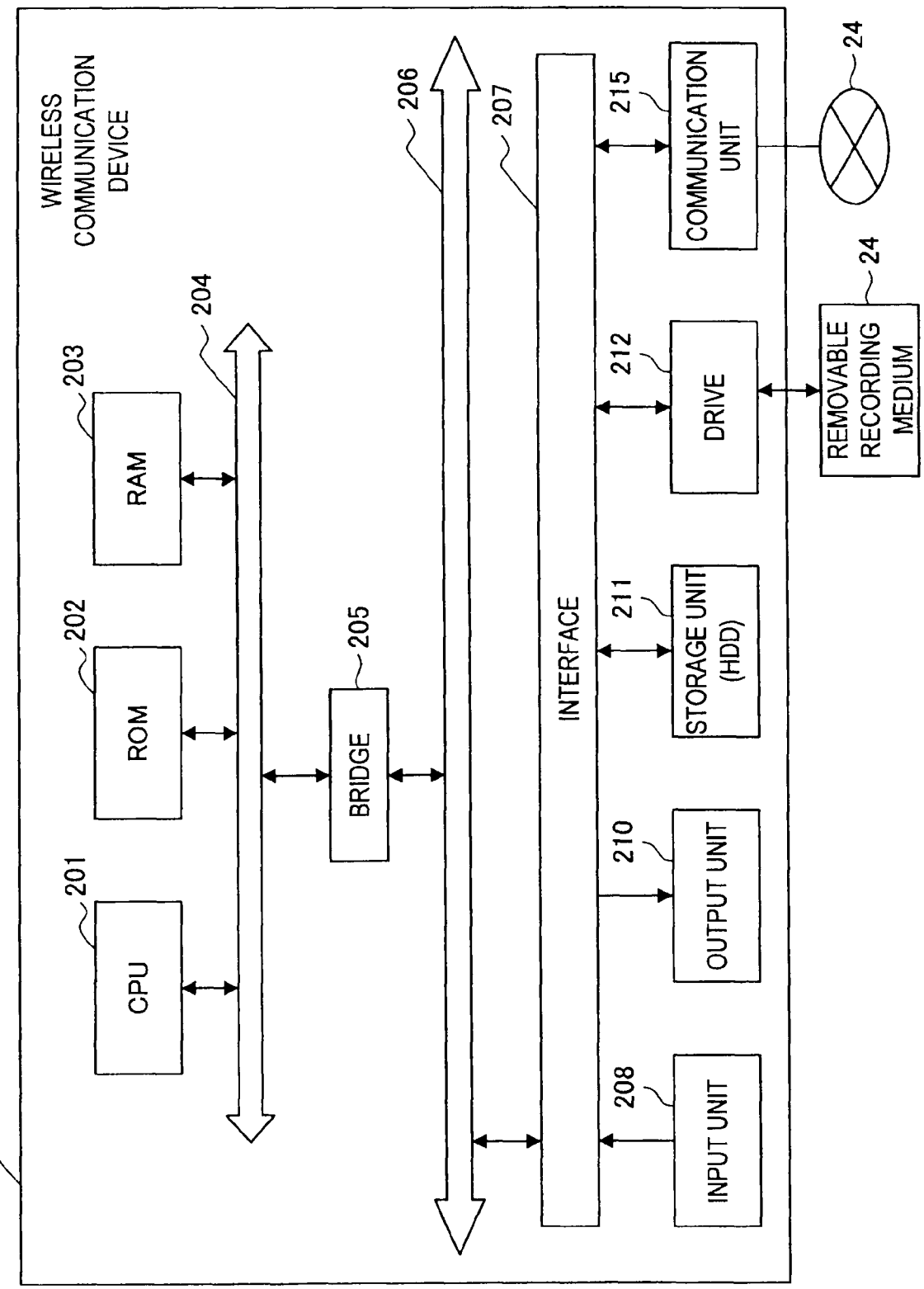
FIG. 1 is a block diagram showing the hardware configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A "DETAILED DESCRIPTION OF EMBODIMENT" will be described in the order shown below:

[1] Purpose of the embodiment
[2] Hardware configuration of the information processing apparatus
[3] Functional configuration of the information processing apparatus
[4] Flow of display control processing
[1] Purpose of the Embodiment First, the purpose of the embodiment of the present invention will be described. In recent years, an increasing amount of content extending over various categories such as the photo, video, and music is managed by a general user as a result of a marked increase in storage capacity of an information processing apparatus such as a PC (Personal Computer) used by the general user. The user activates an application suitable for each piece of content to display or process photos or reproduce video or music.

For example, an application that classifies software in accordance with the category of content and provides a screen interface that can facilitate the selection of software to reproduce or edit content is known. On the screen interface, one of the categories such as the photo, video, and music is first selected by the user. Then, software corresponding to the selected category and a description of the software are displayed on the screen interface. The user reads and examines the description of the displayed software to select software fitting the user's purpose. Then, an information processing apparatus activates the software selected by the user.

However, regarding the function of an application installed on the PC, it is difficult for the user to understand features thereof without reading an explanation of an electronic manual or instruction manual thereof. Particularly when there are many pieces of software on the PC, it is difficult to search for intended software without reading the display of description of individual software one by one. Thus, it is difficult for the user to easily understand the function realizable by each application.

Thus, with the above situation being focused on, an information processing apparatus 100 according to an embodiment of the present invention has been developed. According to the information processing apparatus 100 in the present embodiment, the user can easily understand the function realizable by an application. More specifically, the function realizable by any application can be reproduced in a pseudo manner by using content associated with listed thumbnails. That is, a display (promotion display) that causes the user to recognize details of any application or how to use the application can be made by reproducing an execution state of the application. Due to the promotion display concerning any application, the user can easily understand the function realizable by the application or details of a service without reading a manual or instruction manual for each application.

In the present embodiment, the information processing apparatus 100 that can list thumbnails of content is configured as an apparatus integrated with a display device such as LCD, but the present embodiment is not limited by such an example. For example, the information processing apparatus may be configured separately from a display device. The information processing apparatus 100 may be a general-purpose computer such as a PC or workstation, but is not limited by such an example. The information processing apparatus 100 may be, for example, a consumer device such as a video/music reproducer and TV set or a mobile device such as a mobile phone terminal and digital camera.

[2] Hardware Configuration of the Information Processing Apparatus

Next, the hardware configuration of the information processing apparatus 100 according to the present embodiment will be described based on FIG. 1. FIG. 1 is a block diagram showing the hardware configuration of the information processing apparatus 100 according to the present embodiment.

As shown in FIG. 1, the information processing apparatus 100 includes a CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 110, a drive 111, and a communication device 113.

The CPU 101 functions as an arithmetic processing unit and a control unit and controls general operations inside the information processing apparatus 100 according to various programs. The CPU 101 may be a microprocessor. The ROM 102 stores programs and arithmetic parameters used by the CPU 101. The RAM 103 temporarily stores programs used for execution of the CPU 101 and parameters that appropriately change during execution thereof. These units are mutually connected via the host bus 104 configured of a CPU bus or the like.

The host bus 104 is connected to the external bus 106 such as a PCI (Peripheral Component Interconnect/Interface) bus via the bridge 105. Incidentally, the host bus 104, the bridge 105, and the external bus 106 may not be configured separately and these functions may be implemented in one bus.

The input device 108 is configured of an input means used by the user to input information such as a mouse, keyboard, touch panel, button, microphone, switch, and lever, an input control circuit that generates an input signal based on input by the user and outputs the input signal to the CPU 101 and the like. The user of the information processing apparatus 100 can input various kinds of data into or provide processing operations to the information processing apparatus 100 by operating the input device 108.

The output device 109 is configured of, for example, a display device such as a CRT (Cathode Ray Tube) display device, liquid crystal display (LCD) device, OLED (Organic Light Emitting Display) device, and lamp and an audio output device such as a speaker and headphone. The output device 109 outputs, for example, reproduced content. More specifically, the display device displays various kinds of information such as reproduced video data as text or images. The audio output device, on the other hand, converts reproduced audio data and the like into sound for output.

The storage device 110 is a data storage device configured as an example of storage unit of the information processing apparatus 100 according to the present embodiment. The storage device 110 may include a storage medium, a recording device to record data in the storage medium, a reading device to read data from the storage medium, or a deletion device to delete data recorded in the storage medium. The storage device 110 is configured of, for example, an HDD (Hard Disk Drive). The storage device 110 drives the hard disk and stores programs executed by the CPU 101 and various kinds of data. The storage device 110 also has content data, metadata, and device data recorded therein.

The drive 111 is a reader/writer for storage medium and is added to the information processing apparatus 100 internally or externally. The drive 111 reads information recorded on an inserted removable storage medium 120 such as a magnetic disk, optical disk, magneto-optical disk, and semiconductor memory and outputs the information to the RAM 103.

The communication device 113 is a communication interface configured of a communication device and the like to connect to a communication network 121. The communication device 113 may be a wireless LAN (Local Area Network) compliant communication device, wireless USB compliant communication device, or wire communication device that performs communication by wire. The communication device 113 transmits/receives various kinds of data to/from external devices via the communication network 121.

[3] Functional Configuration of the Information Processing Apparatus

In the foregoing, the hardware configuration of the information processing apparatus 100 according to the present embodiment has been described with reference to FIG. 1. Next, the function of the information processing apparatus 100 according to the present embodiment will be described with reference to FIG. 2.

Figure 2:
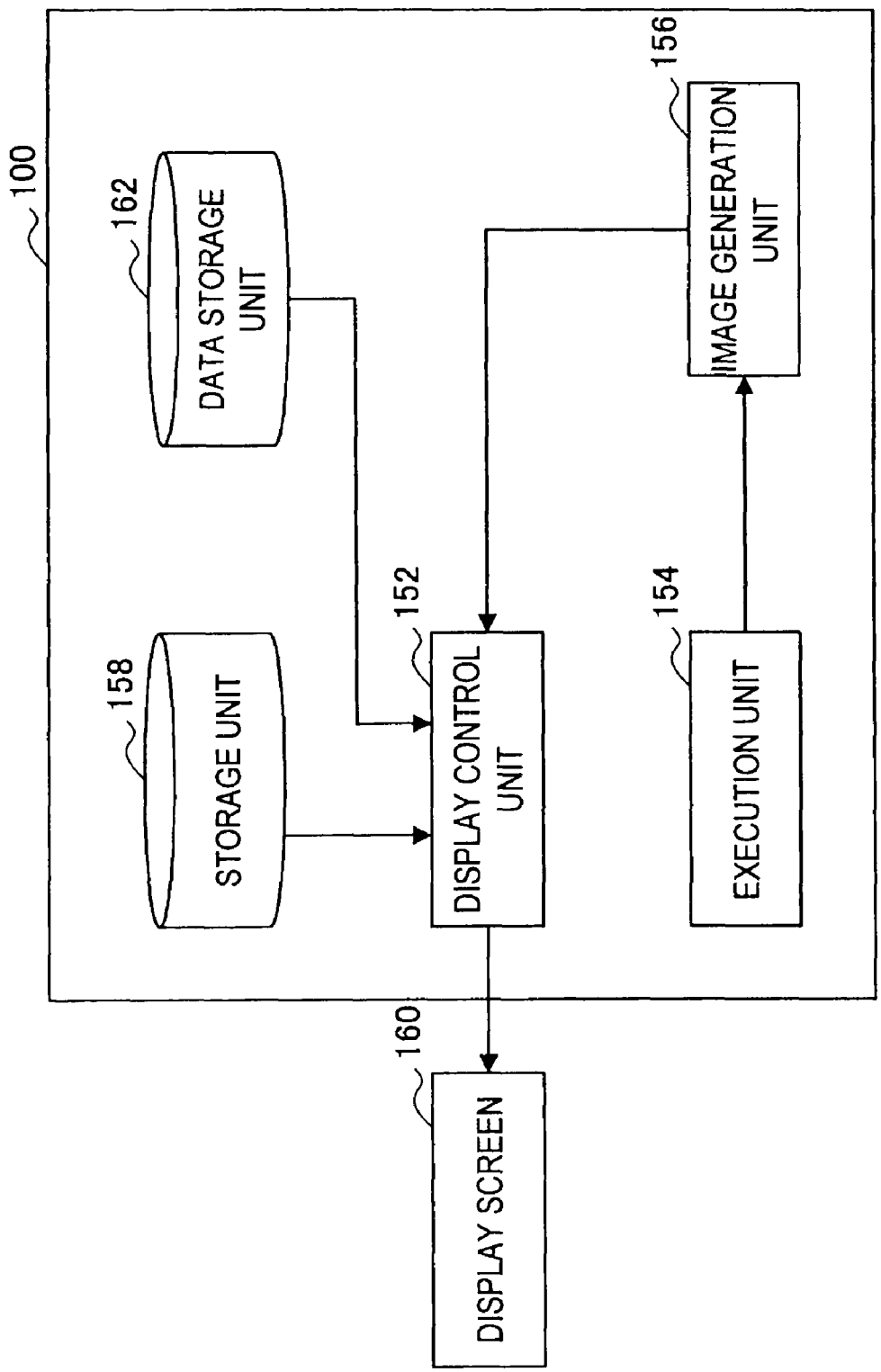
FIG. 2 is a block diagram showing the functional configuration of the information processing apparatus according to the embodiment.

FIG. 2 is a block diagram showing the functional configuration of the information processing apparatus 100 according to the present embodiment. As shown in FIG. 2, the information processing apparatus 100 according to the present embodiment includes a display control unit 152, an execution unit 154, an image generation unit 156, a content storage unit 158, and a data storage unit 162.

The content storage unit 158 is configured of, for example, a storage device such as an HDD (Hard Disk Drive) and semiconductor memory and stores content data of various categories such as the photo, music, and video. Here, the category represents the type of each piece of content such as the photo, music, and video. Content data stored in the content storage unit 158 may be registered in a metadata storage unit (not shown) in units of files or folders containing a plurality of files. Accordingly, metadata of each piece of content is held, for example, in the metadata storage unit and metadata can be generated by analyzing content data.

The display control unit 152 has a function to display a list screen of thumbnails associated with content. More specifically, a list screen of thumbnails associated with each piece of content is presented to the user via a display screen 160 to allow the user to view details of content of various categories stored in the content storage unit 158.

If, for example, the screen size of the list screen displayed in the screen of the display device is limited, content useful for the user of a large amount of content stored in the content storage unit 158 may preferentially be displayed. That is, the number of pieces of content to be displayed for each category may be decided based on the upper limit of the display number in accordance with the screen size of the list screen presented to the user and the display ratio of each category of content. Then, content whose thumbnail to be displayed in the list screen may be selected in accordance with the content display number and metadata of content.

Figure 3:
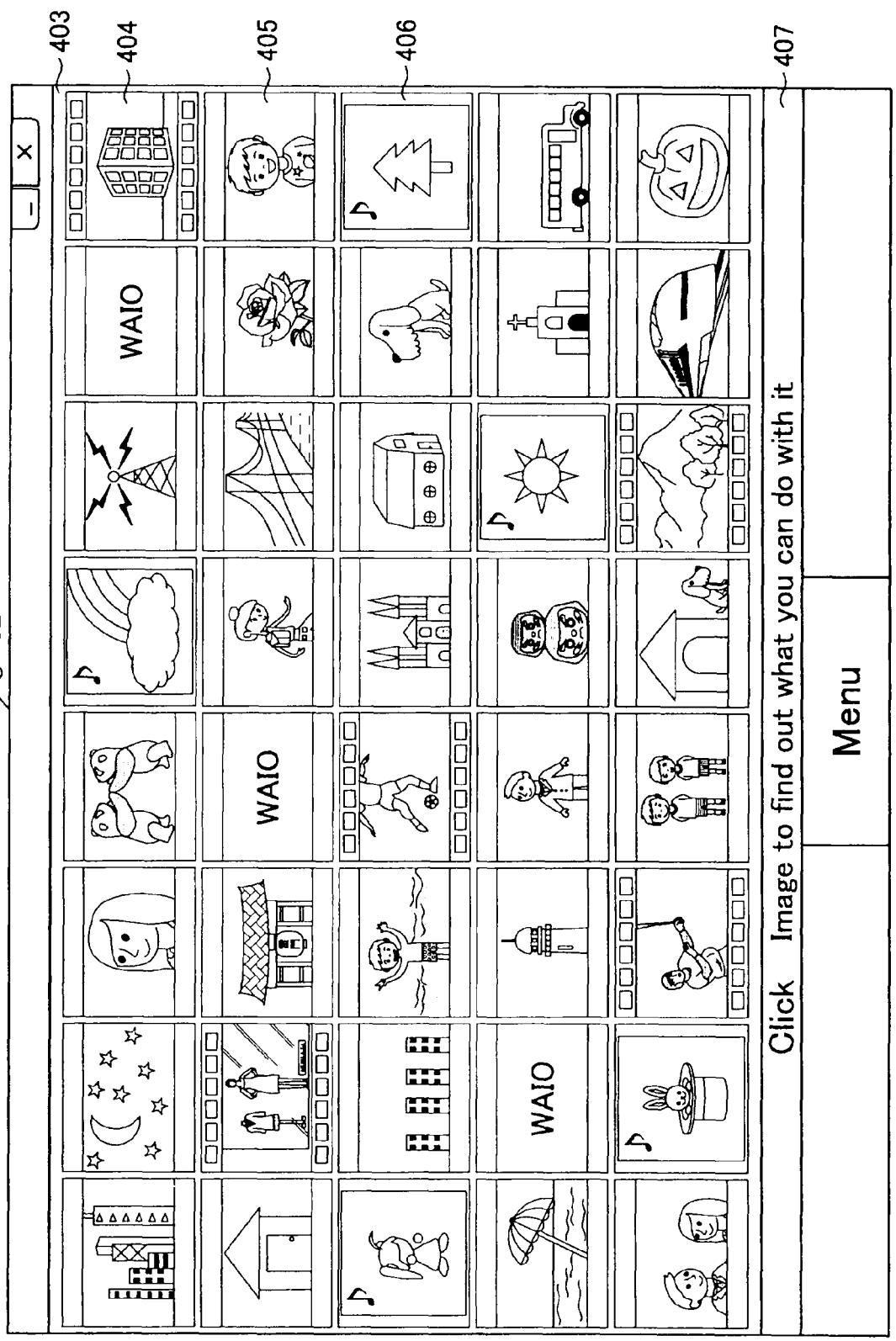
FIG. 3 is an explanatory view illustrating a screen example of a list screen displayed by a display control unit according to the embodiment.

Here, the list screen presented to the user via the display screen 160 by the display control unit 152 will be described with reference to FIG. 3. FIG. 3 is an explanatory view illustrating a screen example of the list screen displayed by the display control unit 152. As shown in FIG. 3, a list screen 402 includes a thumbnail display area 403 and a text information display area 407.

In the present embodiment, the thumbnail display area 403 can display a total of 40 thumbnails, five thumbnails vertically and eight thumbnails horizontally, but the present embodiment is not limited to such an example. Thumbnails contained in the list screen 402 include, for example, a thumbnail 404 of video content, a thumbnail 405 of photo content, and a thumbnail 406 of music content.

In the text information display area 407, a message to instruct or introduce input or the selection by the user is displayed. For example, a message to instruct the user to click any one thumbnail of content in the list screen 402 may be displayed. When the cursor is placed on one of thumbnails of content, the category of the content concerned may be displayed.

The description of the function of the display control unit 152 will continue by returning to FIG. 2. The display control unit 152 has a function to display an execution state image showing the execution state of an application generated by the image generation unit 156 described later in at least a portion of the area where the list screen of thumbnails is displayed. The display control unit 152 may display a display area containing the execution state image periodically in the list screen 402 or randomly at any position in the list screen 402.

The execution unit 154 has a function to execute any application using content associated with thumbnails. An application executed by the execution unit 154 has a function based on the category of content displayed in the list screen 402. That is, if the content is photo content, the application has a function to display photos or to process photos. If the content is video content, the application has a function to reproduce video or to edit video.

An application executed by the execution unit 154 is an application having a function in accordance with details of content. If, for example, the content is music content, one channel among music channels contained as metadata of music content is selected and a reproducible application is executed. The music channel will be described in detail later.

The image generation unit 156 has a function to generate an execution state image showing the execution state of an application by the execution unit 154. The image generation unit 156 provides the generated execution state image to the display control unit 152. As described above, the display control unit 152 displays the execution state image provided by the image generation unit 156 in a portion of the list screen of content of the display screen 160. The execution state image is, as described above, an image that reproduces the function of an application in a pseudo manner.

It is assumed, for example, that an application executed by the execution unit 154 is an application that generates dynamic images by switching and reproducing a plurality of pieces of image content in predetermined timing. In this case, the execution state image generated by the image generation unit 156 will be dynamic images reproduced by a plurality of pieces of image content being switched in predetermined timing. Thus, with dynamic images generated by the image generation unit 156 being displayed in a portion of the display area, the user can check how a plurality of pieces of image content is displayed, how the plurality of pieces of image content is processed and the like. That is, based on displayed dynamic images, the user checks the display (promotion display) that causes the user to recognize details of the application and how to use the application.

Alternatively, it is assumed, for example, that an application executed by the execution unit 154 is an application that generates dynamic images by switching and reproducing a plurality of pieces of video content in predetermined timing. In this case, the execution state image generated by the image generation unit 156 will be dynamic images reproduced by a plurality of pieces of video content being switched in predetermined timing. Alternatively, it is assumed, for example, that an application executed by the execution unit 154 is an application that generates dynamic images by switching and reproducing a plurality of pieces of image content and video content in predetermined timing. In this case, the execution state image generated by the image generation unit 156 will be dynamic images reproduced by a plurality of pieces of image content and video content being switched in predetermined timing.

Alternatively, it is assumed, for example, that an application executed by the execution unit 154 is an application that performs music reproduction processing by reproducing music content and image content (video content) together. In this case, the execution state image generated by the image generation unit 156 will reproduce music and also reproduce the image content (video content).

In this manner, the image generation unit 156 can reproduce execution of various applications in a portion of the display area of the display screen 160. The user can check how a plurality of still images or dynamic images is reproduced by an application by visually confirming an execution state image reproduced by the image generation unit 156.

When a plurality of applications is installed on a PC or the like, the promotion display of each application may successively be made. As described above, what kind of dynamic images is generated using the plurality of still images or dynamic images is different from application to application. Therefore, the user can check details of each application and how to use the application only by visually confirming the promotion display of each application successively displayed in the display screen 160.

The display control unit 152 may list a plurality of images associated with content in a predetermined display area of the display screen 160 so that the execution unit 154 executes any application using content associated with listed images. Then, a reproducing unit (not shown) reproduces the execution state of an application by the execution unit 154. The aforementioned display control unit 152 and image generation unit 156 are examples of the reproducing unit. The reproducing unit reproduces the execution state of an application by using at least a portion of the predetermined display area of the display screen 160.

The reproducing unit also reproduces dynamic image reproduction processing using image content or video content associated with listed images. The reproducing unit may reproduce dynamic image reproduction processing in which a plurality of pieces of image content uses video content. Further, the reproducing unit may reproduce music reproduction processing using music content associated with listed images.

Further, the reproducing unit may reproduce the execution state of an application by using content associated with images that were displayed in the display area to reproduce the execution state of an application. The reproducing unit may also reproduce the execution state of an application using at least a portion of the predetermined display area of the display screen 160 by causing the execution unit to execute the application.

Thus, the execution state of an application is reproduced by the reproducing unit so that the promotion display of each application can be made. That is, the execution state of an application is reproduced by the reproducing unit without the application actually being executed so that dynamic images just like those when the application is executed can be generated. Therefore, the user can check details of each application and how to use the application only by visually confirming the promotion display of each application.

Figure 4:
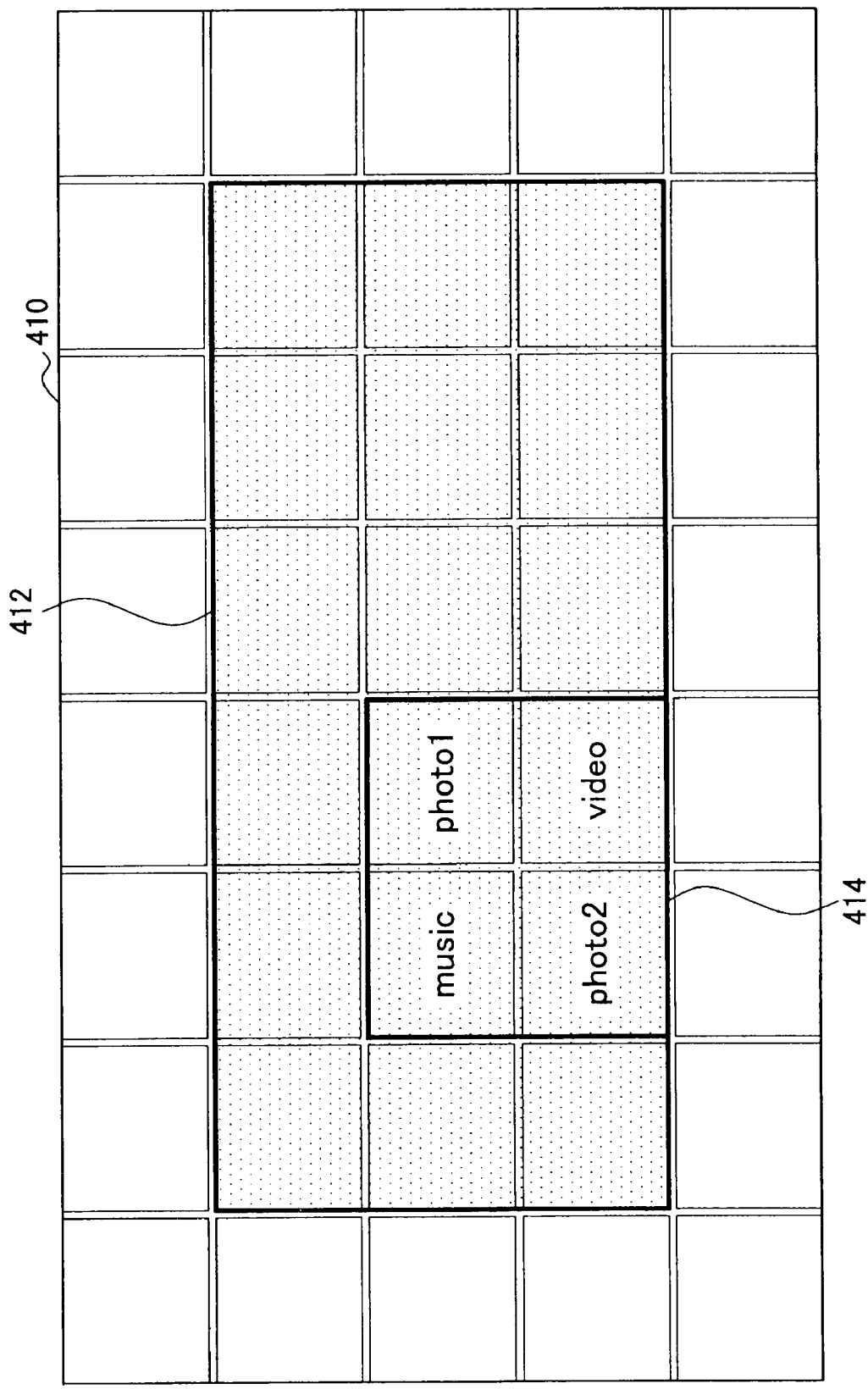
FIG. 4 is an explanatory view illustrating an execution state image displayed in the list screen according to the embodiment.
Figure 5:
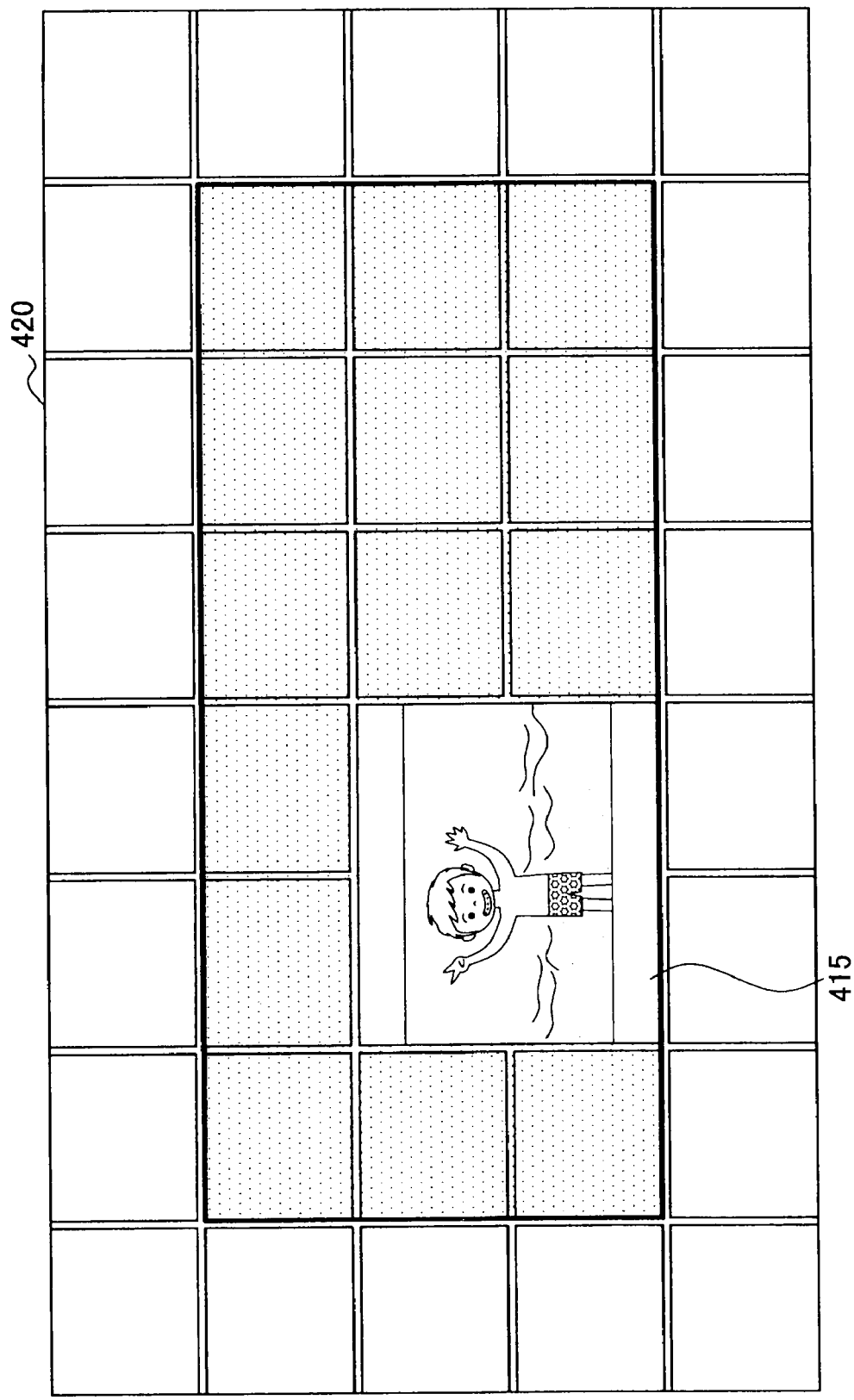
FIG. 5 is an explanatory view illustrating an execution state image displayed in the list screen according to the embodiment.

Here, execution state images displayed in the list screen 402 will be described with reference to FIGS. 4 to 7. FIGS. 4 and 5 are explanatory views illustrating execution state images generated by an image generation application. The image generation application exemplified here has a function to easily create a short movie like a movie production using materials of, for example, video and still images. A case in which the execution state of an application is reproduced by the above reproducing unit will be described below. That is, promotion images reproducing the execution state of an application are generated by content associated with listed images being used by the reproducing unit.

First, content used by an image generation application when the image generation application is executed by the reproducing unit will be described. A case in which a display area 414 of a list screen 410 in FIG. 4 is used as a display area where an execution state image is displayed will be described. In this case, the application may be executed using any one piece of content displayed in the display area 414 or any one piece of content displayed around the display area 414.

A case when, for example, the reproducing unit executes the image generation application using any one piece of content displayed in the display area 414 will be described. The reproducing unit first determines whether the display area 414 contains photo content (photo1, photo2) or private video content (video) imaged by the user. Then, the reproducing unit acquires any number of photos or of pieces of private video whose shooting date is near that of the photos or private video from the content storage unit 158. In the present embodiment, for example, 12 pieces of content are acquired from the content storage unit 158, but the present embodiment is not limited to such an example.

After acquiring 12 pieces of content from the content storage unit 158, the reproducing unit reproduces the content by switching the content in predetermined timing. By using a template file described later, the reproducing unit can reconstruct reproduction of a short movie like a movie production using materials of video and still images realized by the application in a portion of the display area of the display screen 160.

Content acquired by the reproducing unit from the content storage unit 158 is acquired using the shooting date as a reference, but the present embodiment is not limited to such an example. For example, only photos containing the face of a person may be acquired or only image content (photo) or video content (private video) containing a smiling face of a person may be acquired. Alternatively, only image content (photo) or video content (private video) containing the face of the same person may be acquired using the face recognition function. Further, only image content (photo) or video content (private video) containing only adults or children may be acquired.

Alternatively, only photos or private video according to user's preferences may be acquired by storing data obtained by analyzing user's preferences in the data storage unit 162. If photo content is acquired using the shooting date as a reference as described above, but it is difficult to acquire as many pieces of photo content as necessary, the rest of photo content may be acquired according to user's preferences.

Content is acquired by the reproducing unit according to the above method and then, an execution state image is generated. Then, as shown in FIG. 5, the execution state image showing the execution state of the image generation application is displayed in a display area 415. That is, not only photo content, but also an image that reproduces the function of the image generation application in a pseudo manner is displayed in the display area 415.

If, for example, only image content containing a smiling face of a person is acquired by the reproducing unit, dynamic images consisting of only image content containing a smiling face of a person are displayed in the display area 415. If video content containing only children is acquired by the reproducing unit, dynamic images consisting of only video content containing only children are displayed in the display area 415.

If neither photo content nor private video is present in the display area 414 in FIG. 4, up to 12 pieces of photo content may be acquired by the procedure below:

(1) Acquire the latest 12 pieces from photo content held as old photos in the content storage unit 158.

(2) If the number of old photos is less than the necessary number of 12 in (1), acquire as many pieces as necessary randomly from all photo contents held in the content storage unit 158.

(3) If one piece of photo content or more can be acquired in (2), use only acquired photo content.

(4) If no piece of photo content is acquired in (3), images using photo content are not generated and instead, sample images preserved by the image generation application in advance are displayed.

If the image generation application to be reproduced has a plurality of template files for image generation, the reproducing unit randomly selects one template file from the plurality of template files. Here, the template file is a file in which BGM (BackGround Music), two material frames or more, one effect (effect frame) or more, and one transition (transition frame) or more are predefined in accordance with the time code, which is the reproduction time from the start.

BGM is music set in keeping with the theme of the template file and is played when images are displayed (reproduced). The material frame is a box (container) into which a file of image content or video content as an image material is inserted and is arranged by fitting to points where the tempo of BGM changes or the like. Whether to insert image content or video content into the material frame is predefined as metadata described later and effects to zoom a material frame into which image content is to be inserted, change the color of image to sepia and the like are defined appropriately. Effects are similarly defined for video.

Also, transitions defining the transition method of images when (an image of) the material frame before switching to (an image of) the material frame after switching such as the fade-in, fade-out, and appearing from the left of the screen and disappearing to the right of the screen are arranged by fitting to timing of switching from (an image of) the predetermined material frame to (an image of) the next material frame defined in a template file. Also, effects and transitions that are in keeping with the theme and taste of the template file are adopted.

The reproducing unit specifies one of the above template files to create an execution state image. More specifically, the reproducing unit detects a file of still images or video that matches a material frame from the content storage unit 158. Then, generation of dynamic images that are a sequence of images in keeping with the theme held by the template file and to which effective staging by BGM, effects, transitions and the like is added is performed. Then, dynamic images that show the execution state of the application by the execution unit 154 and to which effective staging by BGM, effects, transitions and the like is added are generated and displayed in the display area 415 in FIG. 6.

Next, a case in which a music reproduction application is executed by the reproducing unit will be described. A case in which the display area 414 of the list screen 410 in FIG. 4 is defined as a display area where an execution state image is displayed will be described. In this case, the reproducing unit may execute the application using any one piece of content displayed in the display area 414 or any one piece of content displayed around the display area 414.

For example, when the reproducing unit executes the music reproduction application using any one piece of content displayed in the display area 414, the reproducing unit first determines whether the display area 414 contains music content (music). Then, the reproducing unit uses music content found first as a reference and acquires metadata obtained by performing twelve-tone analysis on the music content.

The reproducing unit selects one music channel from among music channels in which acquired metadata is contained and performs reproduction of the music channel. If a plurality of pieces of music content is contained in the display area 414, the music channel may be selected randomly.

The above music channel is a channel classified according to music genre or mood. For example, channels classified according to "feeling" such as a channel that reproduces recommended music by time zone, a channel that reproduces lively and cheerful music, a channel that reproduces soft and melancholic music, and a channel that reproduces music with a catchy rhythm can be exemplified. Also, channels classified according to "features of music" such as a channel that reproduces classical music, a channel that reproduces hard rock music, and a channel that reproduces ballad music are known.

Figure 6:
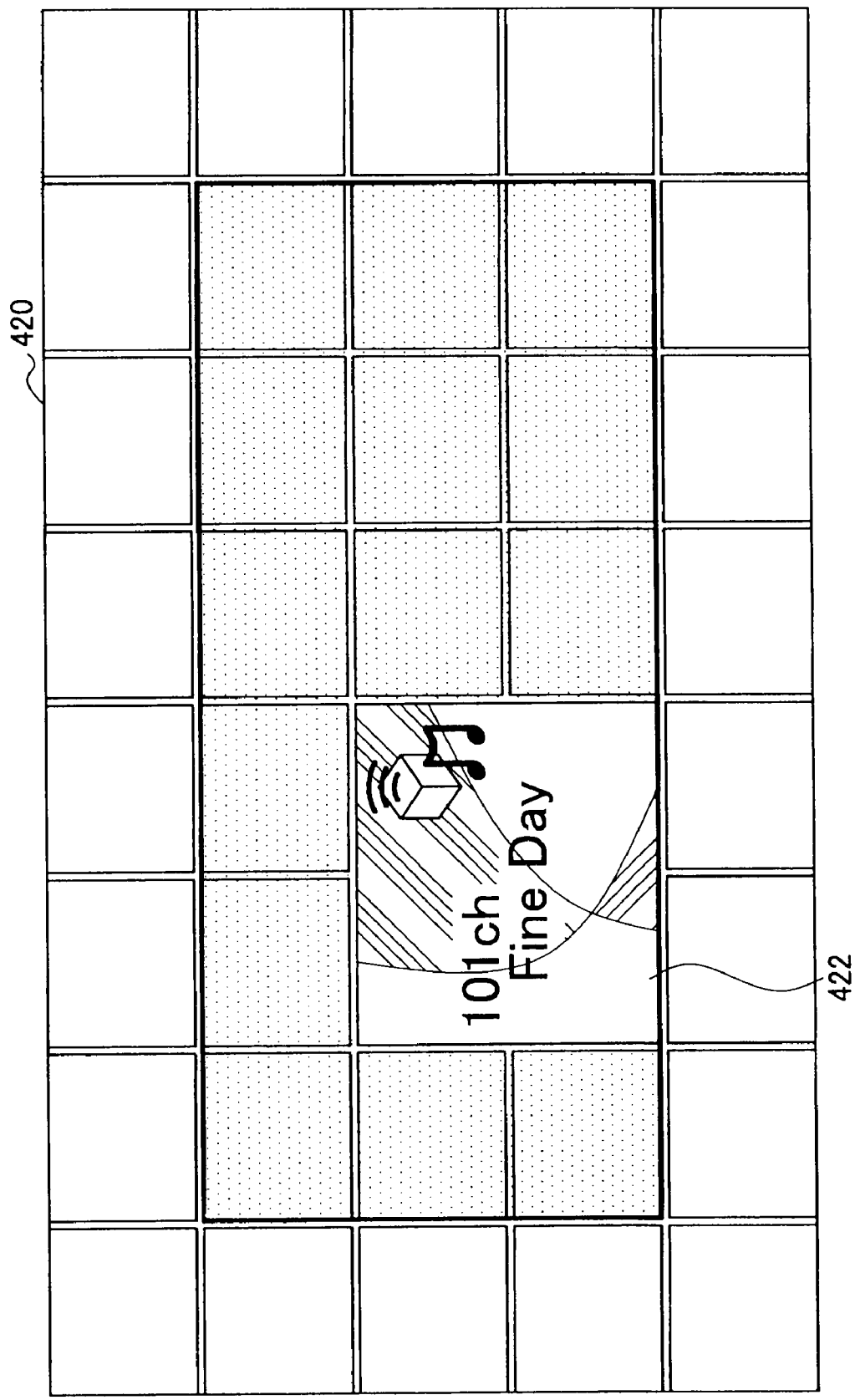
FIG. 6 is an explanatory view illustrating an execution state image displayed in the list screen according to the embodiment.

A music channel of mood fitting to a time when the list screen 402 is displayed may be selected. Alternatively, as shown in FIG. 6, images such as animation video representing the mood of the selected music channel may be displayed in a display area 422 for a fixed time.

The reproducing unit executing the music reproduction application may detect catchy part in the music content to reproduce music for a fixed time from the catchy part. If, for example, music is reproduced for about one minute after catchy part and reproduction of music content ends before about one minute passes, reproduction may start from catchy part of other music content contained in the channel.

Figure 7:
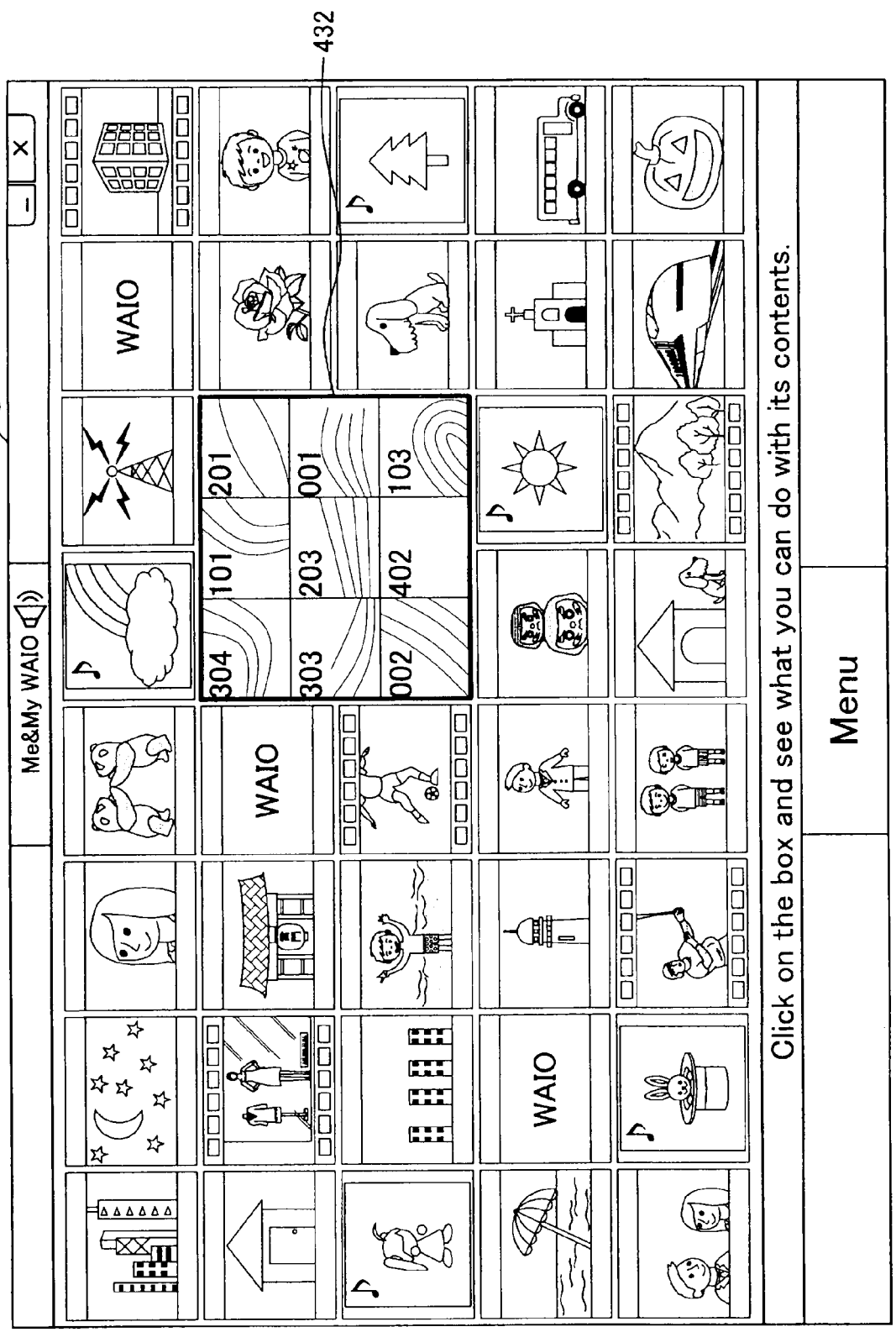
FIG. 7 is an explanatory view illustrating an execution state image displayed in the list screen according to the embodiment.

If a plurality of music channels is present, as shown in FIG. 7, the reproducing unit may display nine randomly selected channels at the end of the above animation video in a display area 432. For example, reproduction of the music reproduction application ends by generating 3×3 grids in 2×2 panel frames of thumbnails of content to display music channels for a fixed number of seconds. Accordingly, the user can be made to know the presence of the music channels executed by the music reproduction application.

Next, an appearance method of an execution state image displayed in the list screen 402 will be described. For example, after the list screen 402 is displayed, the reproducing unit specifies the display area where an execution state image is displayed by the image generation application or the music reproduction application after 14 seconds pass. The reproducing unit may randomly specify display areas where an execution state image is displayed, instead of one location of the display area. If the reproducing unit randomly specifies display areas, the reproducing unit determines the order of displaying an execution state image.

Then, the reproducing unit displays an execution state image generated by the image generation unit 156 in specified display areas in the decided order. Then, after displaying the execution state image for a predetermined time, the display may be switched to the list screen 402 again. As described above, an execution state image may be generated according to the template held by each application. In this case, after the display of an execution state image according to one template ends, the display may be switched to the list screen 402 again.

After being switched to the display of the list screen 402, the execution state image may be displayed in the predetermined display area again. In the foregoing, the functional configuration of the information processing apparatus 100 has been described. In execution of the above image generation application or music reproduction application, a case in which dynamic images and the like are generated by the reproducing unit without actually executing the above application has been described. However, the present embodiment is not limited to such an example and an actual application (API (Application Program Interface)) can be caused to execute to generate the above promotion image.

[4] Flow of Display Control Processing

Figure 8:
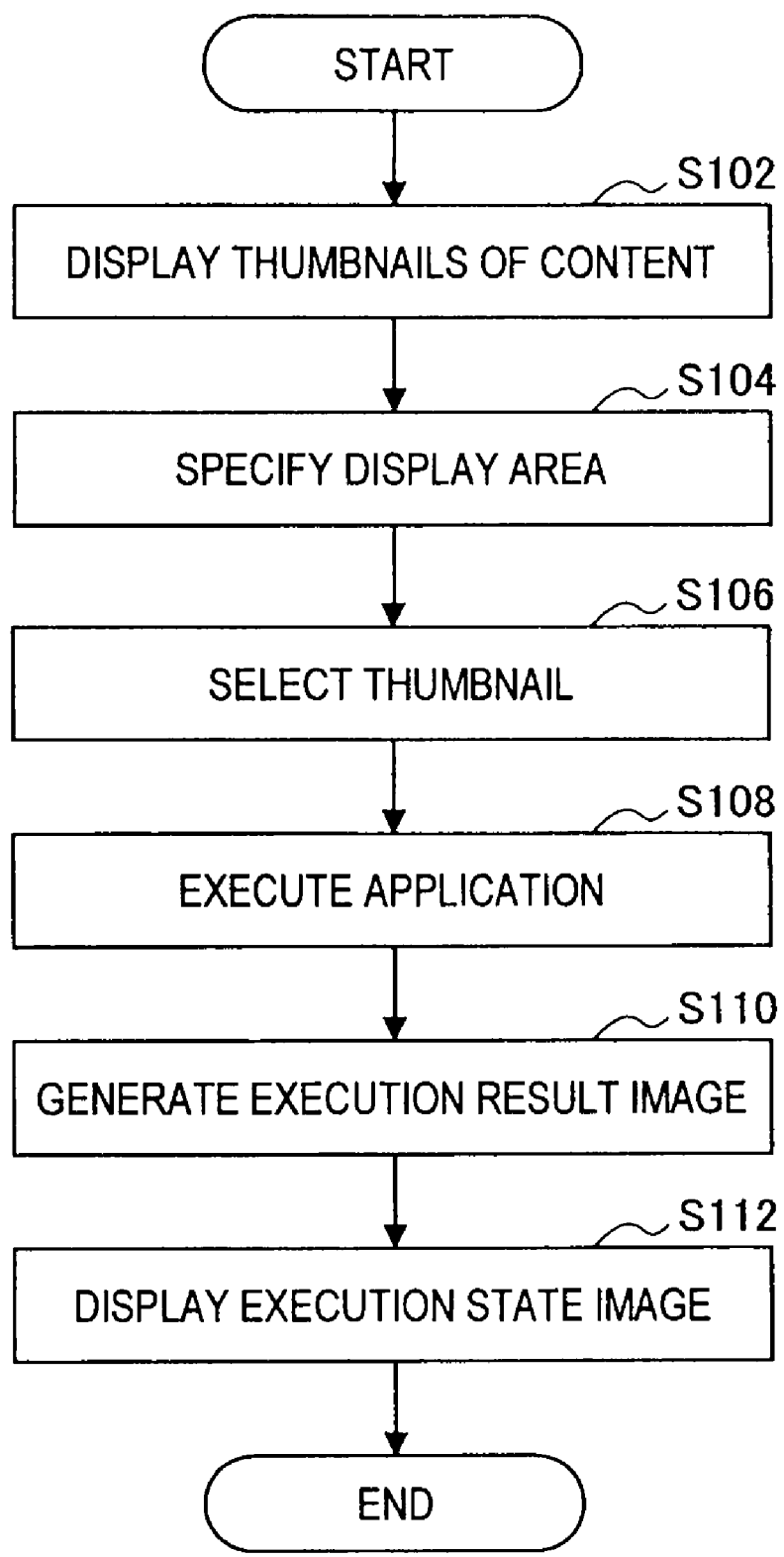
FIG. 8 is a flow chart showing the flow of display control processing in the information processing apparatus according to the embodiment.

Next, display control processing in the information processing apparatus 100 will be described with reference to FIG. 8. FIG. 8 is a flow chart showing the flow of display control processing in the information processing apparatus 100.

As shown in FIG. 8, the display control unit 152 first displays a list screen of thumbnails associated with content via the display screen 160 (S102). Next, the execution unit 154 specifies display areas of an execution state image in the list screen 402 (S104).

Then, from among display areas determined at step S104, content used by an application executed by the execution unit 154 is selected (S106). In addition, content other than the selected content is acquired from the content storage unit 158.

Then, the execution unit 154 executes any application using the content selected at step S106 (S108). Then, the image generation unit 156 generates an execution state image showing the execution state of the application executed at step S108 (S110).

Then, the display control unit 152 displays the execution state image generated at step S110 in at least a portion of the area where the list screen 402 is displayed (S112). In the foregoing, the display control method of the information processing apparatus 100 has been described.

According to the information processing apparatus 100 in the present embodiment, the list screen 402 of thumbnails associated with content is displayed in the display screen 160. The execution unit 154 executes any application using content associated with thumbnails and an execution state image showing an execution state of the application is generated. The generated execution state image is displayed in at least a portion of the area where the list screen 402 is displayed.

Accordingly, the function that can be realized by an application installed on a PC or the like by using content can be reproduced in a pseudo manner. Therefore, the user can easily understand the function realizable by an application without reading a manual or instruction manual of each application.

It should be understood by those skilled in the art that various modifications, combinations, sub-combinations and alterations may occur depending on design requirements and other factors insofar as they are within the scope of the appended claims or the equivalents thereof.

In the above embodiment, for example, the application executed by the execution unit 154 is an image generation application or music reproduction application, but the present embodiment is not limited to such an example. For example, the application may be a video generation application that uses video content or content of TV programs. Alternatively, the application may be an application that adds any character subtitle to image content.

The present application contains subject matter related to that disclosed in Japanese Priority Patent Application JP 2008-302259 filed in the Japan Patent Office on 27 Nov. 2008, the entire content of which is hereby incorporated by reference.

What is claimed is:

1. An information processing apparatus, comprising:
    a display control unit that displays a list screen of thumbnails associated with content;
    an execution unit that executes a software application using the content associated with the thumbnails; and
    an image generation unit that generates an execution state image showing an execution state that corresponds to a preview of a function of the software application by the execution unit, wherein
    the display control unit displays the execution state image generated by the image generation unit, as the preview of the function of the software application, in at least a portion of an area where the list screen is displayed.

2. The information processing apparatus according to claim 1, wherein
    the execution state image generated by the image generation unit is an image that reproduces the function of the software application in a pseudo manner.

3. The information processing apparatus according to claim 1, wherein
    the software application executed by the execution unit uses content associated with the thumbnails in the area where the execution state image is displayed.

4. The information processing apparatus according to claim 1, wherein
the software application executed by the execution unit uses content associated with the thumbnails around the area where the execution state image is displayed.

5. The information processing apparatus according to claim 1, wherein
the function of the software application executed by the execution unit is based on a category of the content associated with the thumbnails.

6. The information processing apparatus according to claim 1, wherein
the software application executed by the execution unit is an application having the function in accordance with details of the content associated with the thumbnails.

7. The information processing apparatus according to claim 1, wherein
the software application executed by the execution unit uses photo content associated with, among the thumbnails displayed in the list screen, the thumbnails containing a face area.

8. The information processing apparatus according to claim 1, wherein
the software application executed by the execution unit uses content associated with, among the thumbnails displayed in the list screen, a predetermined number of the thumbnails.

9. An information processing apparatus, comprising:
a display control unit that lists a plurality of images associated with content in a predetermined display area;
an execution unit that executes a software application using the content associated with the images; and
a reproducing unit that reproduces an execution state that corresponds to a preview of a function of the software application by the execution unit, wherein the reproducing unit reproduces the execution state of the application, as the preview of the function of the software application, using at least a portion of the predetermined display area.

10. The information processing apparatus according to claim 9, wherein the reproducing unit reproduces dynamic image reproduction processing using image content or video content associated with the images.

11. The information processing apparatus according to claim 9, wherein the reproducing unit reproduces music reproduction processing using music content associated with the images.

12. The information processing apparatus according to claim 9, wherein the reproducing unit reproduces the execution state of the application using content associated with the images that were displayed in the display area to reproduce the execution state of the application.

13. The information processing apparatus according to claim 9, wherein the reproducing unit reproduces the execution state of the application using the at least a portion of the predetermined display area by causing the execution unit to execute the application.

14. A display control method, comprising the steps of:
displaying a list screen of thumbnails associated with content;
executing a software application using the content associated with the thumbnails;
generating an execution state image showing an execution state that corresponds to a preview of a function of the software application; and
displaying the generated execution state image, as the preview of the function of the software application, in at least a portion of an area where the list screen is displayed.

15. A computer-readable storage medium including computer executable instructions, wherein the instructions, when executed by a computer, cause the computer to perform a display control method, the display control method comprising:
displaying a list screen of thumbnails associated with content;
executing a software application using the content associated with the thumbnails;
generating an execution state image showing an execution state that corresponds to a preview of a function of the software application; and
displaying the execution state image, as the preview of the function of the software application, in at least a portion of an area where the list screen is displayed.

16. The information processing apparatus according to claim 9, wherein the plurality of images include images representing video content, images representing photo content, and images representing music content.

* * * * *